(12) United States Patent
Andou et al.

(10) Patent No.: US 11,384,710 B2
(45) Date of Patent: Jul. 12, 2022

(54) CONTROL DEVICE FOR FUEL INJECTION SYSTEM

(71) Applicant: DENSO CORPORATION, Kariya (JP)

(72) Inventors: Yuusuke Andou, Kariya (JP);
Hisatoshi Shibuya, Kariya (JP);
Satoshi Masuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/382,655

(22) Filed: Jul. 22, 2021

(65) Prior Publication Data

US 2021/0348577 A1 Nov. 11, 2021

Related U.S. Application Data

(63) Continuation of application No. PCT/JP2020/001769, filed on Jan. 20, 2020.

(30) Foreign Application Priority Data

Jan. 24, 2019 (JP) .............................. JP2019-010633

(51) Int. Cl.
*F02D 41/22* (2006.01)
*F02D 41/38* (2006.01)
*F02D 41/30* (2006.01)

(52) U.S. Cl.
CPC ......... *F02D 41/3863* (2013.01); *F02D 41/22* (2013.01); *F02D 41/3082* (2013.01); *F02D 2041/224* (2013.01); *F02D 2200/0602* (2013.01); *F02D 2200/101* (2013.01); *F02D 2250/31* (2013.01)

(58) Field of Classification Search
CPC .. F02D 41/3863; F02D 41/22; F02D 41/3082; F02D 41/065; F02D 41/3854; F02D 41/3809; F02D 41/3836; F02D 2041/224; F02D 2200/0602; F02D 2200/101; F02D 2250/31; F02D 2250/04; F02M 37/08; F02M 55/02; F16K 37/00
USPC ....... 123/456, 457, 510, 511, 514, 299, 300; 701/103–105, 107
See application file for complete search history.

(56) References Cited

U.S. PATENT DOCUMENTS

| | | | |
|---|---|---|---|
| 8,132,558 B2* | 3/2012 | Lucas | F04B 53/10 |
| | | | 137/505.11 |
| 8,727,752 B2* | 5/2014 | Lucas | B27B 21/04 |
| | | | 417/540 |
| 9,243,623 B2* | 1/2016 | Lucas | F04B 11/00 |

(Continued)

*Primary Examiner* — Hai H Huynh
(74) *Attorney, Agent, or Firm* — Nixon & Vanderhye P.C.

(57) ABSTRACT

A control device is included in a fuel injection system. The fuel injection system includes a low pressure pump, a high pressure pump, an accumulator, a fuel injection valve, a relief valve, and a return pipe. The high pressure pump increases a pressure of a fuel discharged from the low pressure pump and discharges high pressure fuel. The accumulator stores the high pressure fuel discharged from the high pressure pump. The relief valve is provided in a high pressure portion provided downstream from the high pressure pump and opens when a high pressure abnormality occurs in the high pressure portion. The return pipe returns the high pressure fuel in the high pressure portion to a low pressure portion provided downstream from the low pressure pump by the relief valve opening.

8 Claims, 5 Drawing Sheets

(56) References Cited

U.S. PATENT DOCUMENTS 9,279,404 B2 * 3/2016 Aoki .................. F02M 63/0245
2015/0078922 A1 3/2015 Oikawa et al.

* cited by examiner

CONTROL DEVICE FOR FUEL INJECTION SYSTEM

CROSS REFERENCE TO RELATED APPLICATIONS

The present application is a continuation application of International Patent Application No. PCT/JP2020/001769 filed on Jan. 20, 2020, which designated the U.S. and claims the benefit of priority from Japanese Patent Application No. 2019-010633 filed on Jan. 24, 2019. The entire disclosures of all of the above applications are incorporated herein by reference.

TECHNICAL FIELD

The present disclosure relates to a control device for fuel injection system.

BACKGROUND

It is conceivable that a fuel injection system includes a low pressure pump that pressurizes and discharges fuel in a fuel container, a high pressure pump that pressurizes and discharges the fuel pressurized by the low pressure pump, and a fuel rail that is an accumulator that stores the high pressure fuel discharged by the high pressure pump. In the fuel injection system, a relief valve is opened to reduce the pressure in the accumulator in an abnormal state in which pressure of a high pressure portion on the downstream side of the high pressure pump becomes higher than a predetermined valve opening pressure.

SUMMARY

The present disclosure provides a control device for a fuel injection system. The fuel injection system includes a low pressure pump, a high pressure pump, an accumulator, a fuel injection valve, a relief valve, and a return pipe. The high pressure pump increases a pressure of a fuel discharged from the low pressure pump and discharges high pressure fuel. The accumulator stores the high pressure fuel discharged from the high pressure pump. The relief valve is provided in a high pressure portion provided downstream from the high pressure pump and opens when a high pressure abnormality occurs in the high pressure portion. The return pipe returns the high pressure fuel in the high pressure portion to a low pressure portion provided downstream from the low pressure pump by the relief valve opening.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
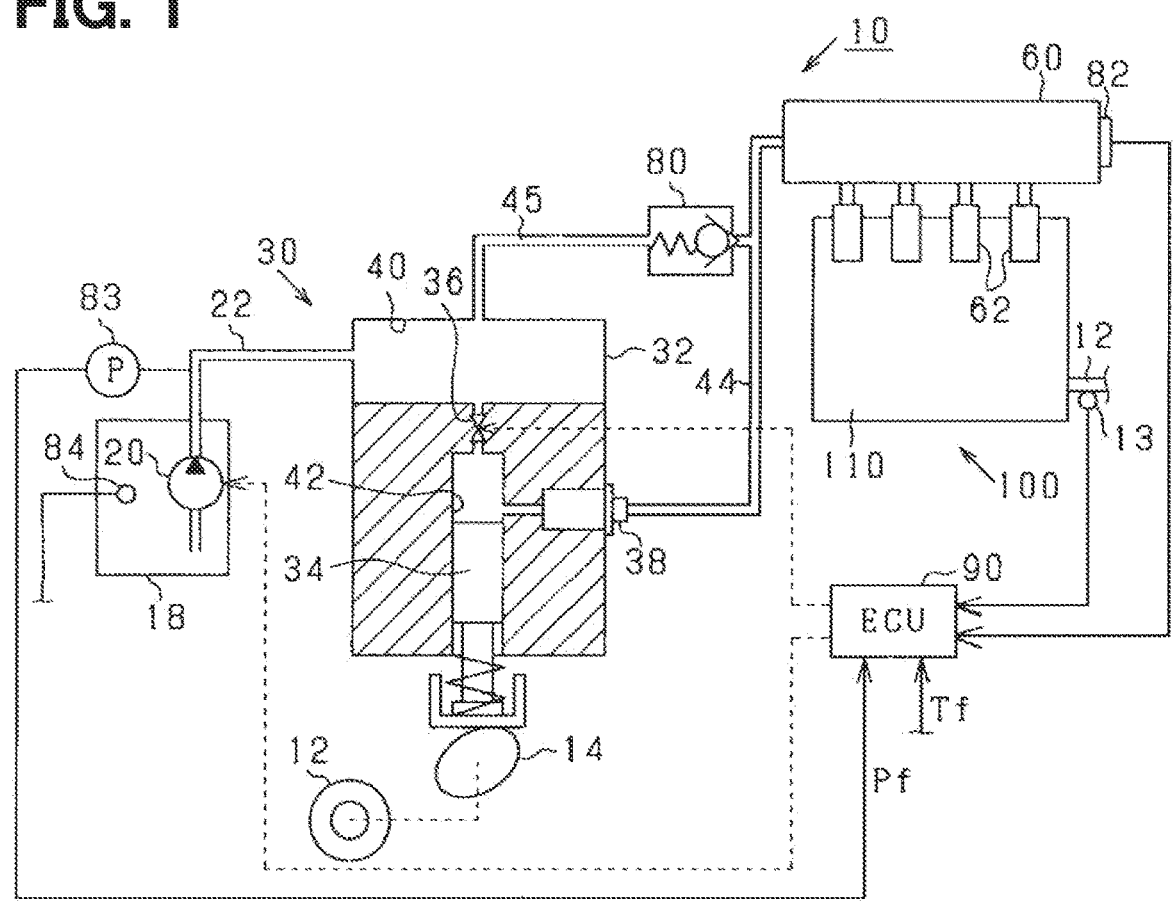
FIG. 1 is a diagram showing a fuel supply system.

For example, an exemplary fuel injection system includes a return pipe that returns fuel in a high pressure portion to a low pressure portion on a downstream side of a low pressure pump by opening a relief valve. In a fuel injection system provided with such a return pipe, when the relief valve is opened, high pressure fuel in the high pressure portion flows into the low pressure portion at once. Thus, spike fuel pressure that changes like a spike is generated in the low pressure portion. The spike fuel pressure may have a peak value higher than a pressure assumed in the low pressure portion. In this case, there is a concern that deterioration of the low pressure portion may be promoted.

The present disclosure provides a control device for a fuel injection system capable of reducing a spike fuel pressure generated in a low pressure portion due to opening of a relief valve.

An exemplary embodiment of the present disclosure provides a control device that is applied for a fuel injection system. The fuel injection system includes a low pressure pump, a high pressure pump, an accumulator, a fuel injection valve, a relief valve, and a return pipe. The low pressure pump pressurizes a fuel in a fuel container and discharges the fuel. The high pressure pump increases a pressure of the fuel discharged from the low pressure pump and discharges high pressure fuel. The accumulator stores the high pressure fuel discharged from the high pressure pump. The fuel injection valve injects the high pressure fuel in the accumulator. The relief valve is provided in a high pressure portion provided downstream from the high pressure pump and opens when a high pressure abnormality occurs in the high pressure portion. The return pipe returns the high pressure fuel in the high pressure portion to a low pressure portion provided downstream from the low pressure pump by the relief valve opening. The control device controls the high pressure fuel in the accumulator within a predetermined pressure range. The control device includes a fuel pressure determination unit and a limiting unit. The fuel pressure determination unit determines whether a pressure in the high pressure portion rises to a predetermined determination pressure higher than the predetermined pressure range and lower than a valve opening pressure for opening the relief valve. The limiting unit causes the low pressure pump to perform a fuel discharge limit when the fuel pressure determination unit determines that the pressure in the high pressure portion rises to the determination pressure.

In the exemplary embodiment of the present disclosure, when the high pressure fuel flows from the high pressure portion to the low pressure portion with the opening of the relief valve, the spike fuel pressure that changes the pressure in a spike shape is generated on the low pressure portion. In this case, the spike fuel pressure is considered to depend on the fuel supply pressure and supply amount from the low pressure pump to the high pressure pump, and can be defined by the following equation.

$$\text{Spike fuel pressure} = Pf + (K \cdot \Delta V lp + K \cdot \Delta V rel - K \cdot \Delta V hp)/Vin - Fpd$$

Pf is the supply pressure of the fuel supplied to the high pressure pump, K is the volume elastic coefficient, $\Delta V lp$ is the amount of fuel supplied to the high pressure pump, $\Delta V rel$ is the relief fuel amount that is the amount of fuel that returns to the low pressure portion side when the relief valve is opened, $\Delta V hp$ is the fuel intake amount of the high pressure pump, Vin is the volume of the low pressure portion, and Fpd is the attenuation amount of the built-in pulsation damper. According to the above configuration, it is determined that the pressure of the high pressure portion has risen to the predetermined determination pressure higher than the pressure range assumed in the accumulator and lower than a predetermined valve opening pressure for opening the relief valve. In this case, the fuel discharge limit for the low pressure pump is performed. As a result, the pressure in the low pressure portion is lowered when the possibility that the relief valve is opened increases as the pressure in the high pressure portion increases. Thus, even when the relief valve is opened, the configuration can cause the spike fuel pressure to be lowered, and deterioration of the low pressure portion can be suppressed.

First Embodiment

First, a configuration of a fuel injection system 100 according to the first embodiment will be described with reference to drawings. A fuel injection system 10 shown in FIG. 1 is mounted on a vehicle and injects fuel into a cylinder of an engine 100 as an internal combustion engine.

Each cylinder of a cylinder block 110 of the engine 100 accommodates a piston connected to a crankshaft 12 as an output shaft. Further, each cylinder is connected to an intake pipe in which inflow air flows through an intake port, and is connected to an exhaust pipe in which exhaust gas is exhausted through an exhaust port.

In the present embodiment, the engine 100 is an in-cylinder injection type (direct injection type) in which fuel is directly injected into the cylinder, and an injector 62 as a fuel injection valve is provided for each cylinder. An ignition plug is attached to each cylinder of the cylinder head of the engine 100, and the air-fuel mixture in the cylinder is ignited by the spark discharge of the spark plug. A rotate angle sensor 13 that outputs a crank angle signal having a pulse shape each time the crank shaft 12 rotates by a predetermined crank angle is attached to the outer peripheral side of the crank shaft 12. The crank angle and the engine rotation speed Ne are detected based on the crank angle signal output from the rotation angle sensor 13.

In addition to the injector 62, the fuel injection system 10 includes a fuel container 18, a low pressure pump 20, a high pressure pump 30, and a delivery pipe 60 which is an accumulator.

The low pressure pump 20 is provided inside the fuel container 18, sucks the fuel in the fuel container 18, pressurizes the fuel, and then discharges the fuel. In the present embodiment, the low pressure pump 20 is a variable feed type pump in which the fuel feed pressure Pf (supply pressure) to the high pressure pump 30 is variable. Specifically, the low pressure pump 20 is an electric pump that operates by rotationally driving an impeller in the pump casing with an electric motor. The low pressure pump 20 adjusts the discharge by changing the rotation speed of the impeller according to the feed pressure target value F*, which is the target value of the feed pressure Pf. For example, the feed pressure target value F* is variably set in the range of 300 to 500 kPa. The outlet of the low pressure pump 20 communicates with the high pressure pump 30 through the low pressure side pipe 22. The high pressure pump 30 increases the pressure of the fuel supplied from the low pressure side pipe 22 and discharges the fuel to the high pressure side pipe 44. The cylinder body 32 of the high pressure pump 30 defines a low pressure chamber 40 and a pressurizing chamber 42. The low pressure chamber 40 communicates with the low pressure side pipe 22 and stores the fuel supplied through the low pressure side pipe 22. A metering valve 36 is provided in the passage where the low pressure chamber 40 and the pressurizing chamber 42 communicate with each other. The metering valve 36 controls the amount of fuel supplied from the low pressure chamber 40 to the pressurizing chamber 42.

The pressurizing chamber 42 is provided with a plunger 34 that changes the pressure in the pressurizing chamber 42 by a reciprocating operation. The end of the plunger 34 opposite to the end on the pressurizing chamber 42 side is connected to a cam 14. The cam 14 is connected to the crankshaft 12 of the engine 100. As the cam 14 rotates with the rotation of the crankshaft 12, the plunger 34 reciprocates between the top dead center and the bottom dead center. Further, the faster the engine rotation speed Ne is, the faster the plunger 34 reciprocates.

The pressurizing chamber 42 is provided with a discharge valve 38 for discharging the fuel pressurized in the pressurizing chamber 42. The discharge port of the discharge valve 38 communicates with the high pressure side pipe 44 connected to the delivery pipe 60. The discharge valve 38 is a check valve that allows fuel to flow from the pressurizing chamber 42 to the high pressure side pipe 44, and is opened when the fuel pressure in the pressurizing chamber 42 exceeds a predetermined discharge pressure.

When the metering valve 36 is opened and the plunger 34 descends from the top dead center to the bottom dead center, the fuel in the low pressure chamber 40 is sucked into the pressurizing chamber 42. When the metering valve 36 is opened and the plunger 34 rises from the bottom dead center toward the top dead center, the fuel in the pressurizing chamber 42 is returned to the low pressure chamber 40 via the metering valve 36. Then, the metering valve 36 is closed and the plunger 34 continues to rise, so that the fuel in the pressurizing chamber 42 is pressurized. When the pressure in the pressurizing chamber 42 becomes equal to or higher than the discharge pressure, the fuel is discharged from the discharge valve 38.

The delivery pipe 60 communicating with the high pressure side pipe 44 stores the fuel discharged by the high pressure pump 30 in a high pressure state. The delivery pipe 60 communicates with the injector 62.

The high pressure side pipe 44 is provided with a relief valve 80. The relief valve 80 is opened when the pressure rises to a predetermined valve opening pressure, and closed when the pressure drops to a predetermined valve closing pressure lower than the valve opening pressure in the valve opening state. The inlet of the relief valve 80 communicates with the high pressure side pipe 44, and the outlet of the relief valve 80 communicates with the low pressure chamber 40 through the return pipe 45. When the relief valve 80 is opened, the fuel in the high pressure side pipe 44 returns to the low pressure chamber 40 through the relief valve 80, and the pressure rise of the high pressure side pipe 44 and the delivery pipe 60 is inhibited. The valve opening pressure for opening the relief valve 80 is set to be lower than, for example, the pressure resistance before the delivery pipe 60 is deteriorated.

In the present embodiment, the low pressure chamber 40 and the low pressure side pipe 22 correspond to a low pressure portion where the fuel returns through the return pipe 45 when the relief valve 80 is opened. The return pipe 45 may return the fuel to the low pressure side pipe 22. Further, the high pressure side pipe 44 corresponds to a high pressure portion.

The delivery pipe 60 is provided with a rail pressure sensor 82 that detects the rail pressure Pr, which is the pressure inside the delivery pipe 60. The low pressure side pipe 22 is provided with a feed pressure sensor 83 that detects the feed pressure Pf, which is the pressure of the fuel supplied to the high pressure pump 30. Inside the fuel container 18, a fuel temperature sensor 84 that detects the fuel temperature Tf is provided.

The fuel injection system 10 includes an ECU 90. The ECU 90 is a microcomputer including a CPU, a ROM, a RAM, a drive circuit, an input/output interface, and the like. The detected values of the sensors 82 to 84 are input to the ECU 90.

The ECU 90 adjusts the fuel injection of the low pressure pump 20 according to the feed pressure target value F*. For example, the ECU 90 performs feedback control for the fuel discharge of the low pressure pump 20 based on the deviation between the feed pressure Pf detected by the feed pressure sensor 83 and the feed pressure target value F*. The ECU 90 may perform open control for the feed pressure. Further, the ECU 90 performs feedback control for the discharge amount of the high pressure pump 30 based on the deviation between the rail pressure target value R*, which is the target value of the rail pressure Pr, and the rail pressure Pr detected by the rail pressure sensor 82. As a result, the rail pressure Pr is appropriately controlled within a predetermined pressure range.

Figure 2:
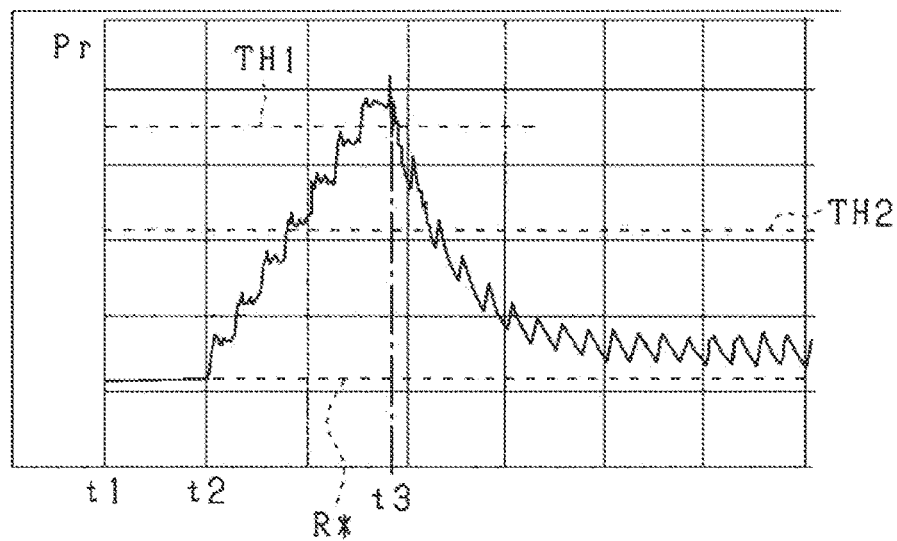
FIG. 2 is a timing chart showing a pressure change in a delivery pipe.

FIG. 2 shows the transition of the rail pressure Pr when a high pressure abnormality occurs on the high pressure portion side in the fuel injection system 10. In FIG. 2, before the time point t1, the high pressure pump 30 has not failed. The injection amount of the high pressure pump 30 is adjusted so that the fuel pressure of the delivery pipe 60 is controlled by the rail pressure target value R*. Immediately before the time point t2, the high pressure pump 30 fails. Resulting in a full discharge abnormality in which the high pressure pump 30 discharges fuel at the maximum discharge amount, the rail pressure Pr rises. At the time point t3, the rail pressure Pr reaches the valve opening pressure TH1 of the relief valve 80, and the relief valve 80 is opened. With the opening of the relief valve 80, the fuel in the high pressure side pipe 44 returns to the low pressure chamber 40 through the return pipe 45, and the rail pressure Pr is lowered after the time point t3.

When the high pressure fuel flows from the high pressure side pipe 44 into the low pressure chamber 40 through the return pipe 45 with the opening of the relief valve 80, a spike fuel pressure that changes the pressure in a spike shape is generated on the low pressure portion side. The spike fuel pressure is considered to depend on the fuel supply pressure and the supply amount to the high pressure pump 30, and can be defined by the following equation (1).

$$\text{Spike fuel pressure} = Pf + (K \cdot \Delta V|p + K \cdot \Delta Vrel - K \cdot \Delta Vhp)/Vin - Fpd \quad (1)$$

Pf is the feed pressure, K is the volume elastic coefficient, $\Delta V|p$ is the amount of fuel supplied to the high pressure pump 30, $\Delta Vrel$ is the relief fuel amount that is the amount of fuel that returns to the low pressure portion side when the relief valve 80 is opened, $\Delta Vhp$ is the fuel intake amount of the high pressure pump 30, Vin is the volume of the low pressure chamber 40 and the low pressure side pipe 22, and Fpd is the attenuation amount of the built-in pulsation damper.

In the above equation (1), by limiting the discharge of the low pressure pump 20, each term of the feed pressure Pf and the supply amount $\Delta V|p$ becomes small, and the spike fuel pressure can be reduced. Here, when the rail pressure Pr is higher than the pressure range controlled by the ECU 90, it is predicted that the rail pressure Pr will rise to the valve opening pressure TH1 of the relief valve 80 due to a pump abnormality or the like. When the ECU 90 determines that the rail pressure Pr rise to a predetermined determination pressure TH2 that is higher than the pressure range assumed in the delivery pipe 60 and lower than the valve opening pressure TH1, the ECU 90 limits the fuel discharge of the low pressure pump 20. In the present embodiment, the ECU 90 corresponds to a fuel pressure determination unit.

In the present embodiment, as a fuel discharge limit, the ECU 90 lowers the feed pressure target value F* in the low pressure pump 20 as compared with the case where the rail pressure Pr does not rise to the determination pressure TH2. As a result, since the feed pressure Pf is lowered, the increase in the spike fuel pressure is suppressed. In the present embodiment, the ECU 90 corresponds to a limiting unit.

The ECU 90 sets, as the feed pressure target value F*, the higher of the saturated vapor pressure of the fuel or the lower limit of the suction limit pressure of the fuel in the high pressure pump 30. The saturated vapor pressure is a pressure at which bubbles may form in the fuel. The suction limit pressure is a feed pressure Pf capable of sucking the fuel from the low pressure side pipe 22 in the high pressure pump 30. Since the saturated vapor pressure of the fuel is higher with the fuel temperature Tf getting higher, the ECU 90 may calculate the saturated vapor pressure of the fuel based on the fuel temperature Tf.

After the generation of the spike fuel pressure is completed, it is not necessary to continue the fuel discharge limit of the low pressure pump 20. The ECU 90 determines whether the relief valve 80 is opened after the fuel discharge is limited. When the ECU 90 determines that the relief valve 80 is opened, the ECU 90 releases the fuel discharge limit on the low pressure pump 20. As the relief valve 80 is opened, the rail pressure Pr is lowered. Therefore, in the present embodiment, the ECU 90 releases the fuel discharge limit when determining that the rail pressure Pr drops to a predetermined release determination pressure TH3 that is assumed due to the opening of the relief valve 80.

In the full discharge state of the high pressure pump 30, the faster the engine rotation speed Ne is, the more the number of discharges of the high pressure pump 30 per unit time increases, so that the discharge amount from the high pressure pump 30 per unit time increases. As a result, the rail pressure Pr converges to a high value after the relief valve 80 is opened. Further, since the volume elastic modulus of the fuel changes according to the fuel temperature Tf, the rate of decrease of the rail pressure Pr after the relief valve 80 is opened and the pressure at the time of convergence change. In the present embodiment, the ECU 90 calculates the release determination pressure TH3 based on the engine rotation speed Ne and the fuel temperature Tf. The ECU 90 corresponds to a valve opening determination unit.

The pressure that contributes to the opening of the relief valve 80 is the pressure in the high pressure side pipe 44. Since the high pressure side pipe 44 has a smaller inner diameter and volume than the delivery pipe 60, the pressure pulsation is larger than the rail pressure Pr. The faster the engine rotation speed Ne is, the larger the pressure pulsation of the high pressure side pipe 44 is. When the engine rotation speed Ne is slow, the maximum value of the pressure pulsation is about 1 to 2 MPa larger than the rail pressure Pr. However, when the rotation speed Ne is fast, the maximum value of the pressure pulsation is about 10 to 15 MPa larger than the rail pressure Pr. Therefore, when the engine rotation speed Ne is fast, the rail pressure Pr at the time of opening the relief valve 80 is about 10 to 15 MPa lower than the valve opening pressure TH1 of the relief valve 80. As a result, the differential pressure between the rail pressure Pr and the low pressure side pressure (corresponding to the feed pressure) becomes small. Therefore, the amount of fuel returned when the relief valve 80 is opened becomes small, and the peak value of the spike fuel pressure becomes smaller than the value when the engine speed Ne is on the low speed side. Unless the peak value of the spike fuel pressure is a value that causes deterioration on the low pressure portion side, it is not necessary to limit the fuel discharge of the low pressure pump 20. Therefore, in the present embodiment, the ECU 90 limits the fuel discharge by the low pressure pump 20 when the rail pressure Pr is higher than the determination pressure TH2 in the case where the engine rotation speed Ne is smaller than the speed determination value TH4, which is the predetermined rotation speed.

Figure 3:
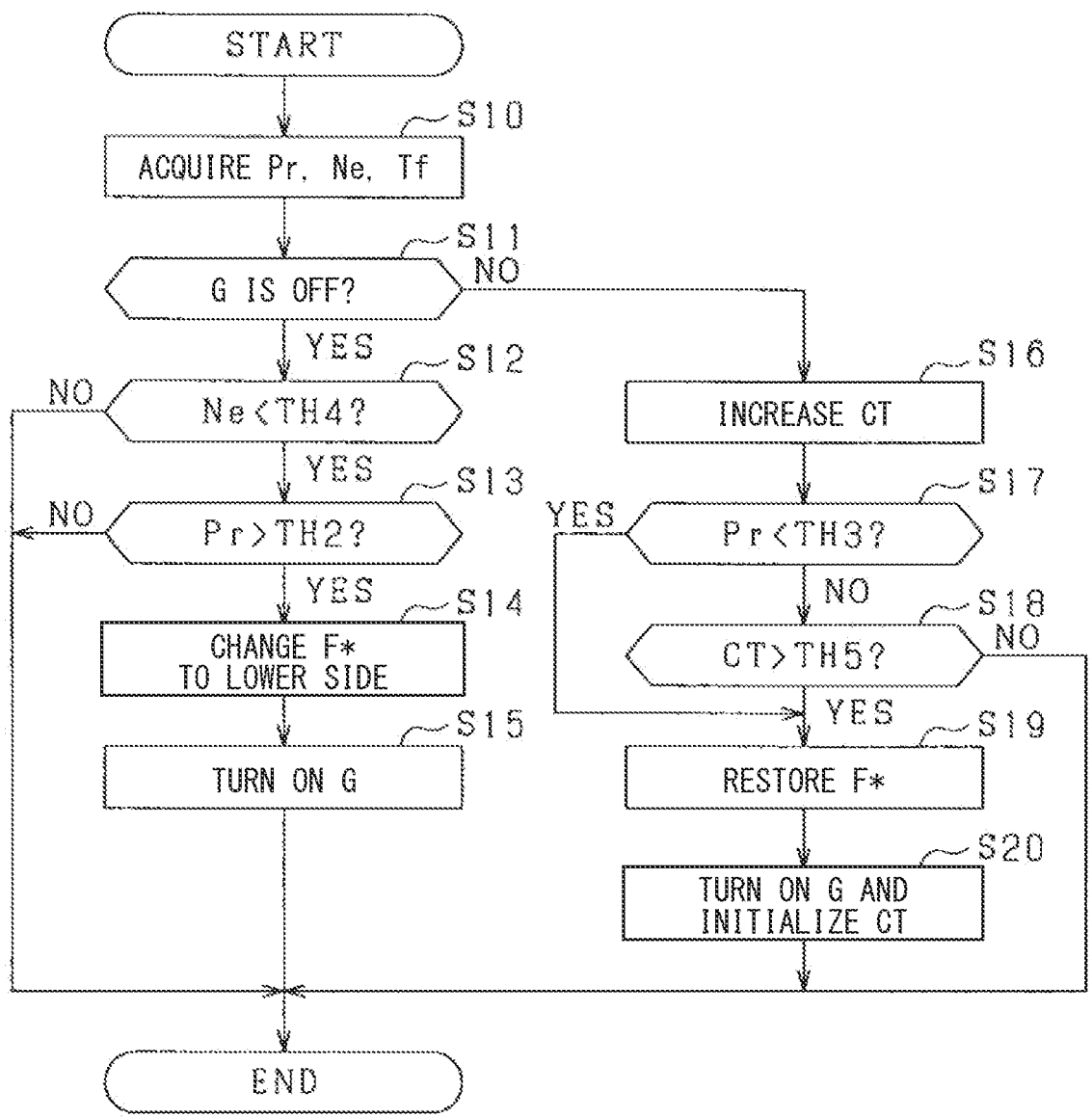
FIG. 3 is a flowchart showing a fuel discharge limit.

Next, the fuel discharge limit for reducing the spike fuel pressure will be described with reference to FIG. 3. The processing shown in FIG. 3 is repeatedly executed by the ECU 90 in a predetermined control cycle period.

In S10, the current rail pressure Pr, the engine rotation speed Ne, and the fuel temperature Tf are acquired.

In S11, it is determined whether the limit execution flag G is off. The limit execution flag is turned on when the fuel discharge limit for the low pressure pump 20 is executed, and is turned off when the fuel discharge limit is not executed. When the limit execution flag G is off, the processing proceeds to S12.

In S12, it is determined whether the current engine rotation speed Ne acquired in S10 is smaller than the speed determination value TH4. When it is determined that the engine rotation speed Ne is equal to or higher than the speed determination value TH4, it is not necessary to reduce the spike fuel pressure. Thus, the processing of FIG. 3 is temporarily terminated.

When it is determined that the engine rotation speed Ne is smaller than the speed determination value TH4, the processing proceeds to S13. In S13, it is determined whether the rail pressure Pr acquired in S10 is higher than the determination pressure TH2. When it is determined that the rail pressure Pr is equal to or less than the determination pressure TH2, it is unlikely that the rail pressure Pr will rise to the valve opening pressure TH1 thereafter. Thus, the processing of FIG. 3 is temporarily terminated.

When it is determined in S13 that the rail pressure Pr is higher than the determination pressure TH2, the processing proceeds to S14. In S14, the feed pressure target value F* is changed to higher value of the lower limit of the suction limit pressure of the high pressure pump 30 or the saturated vapor pressure of the fuel. The saturated vapor pressure of the fuel is calculated from the fuel temperature Tf acquired in S10. As a result, the fuel discharge of the low pressure pump 20 is limited.

In S15, the limit execution flag G is turned on. The processing shown in FIG. 3 is terminated.

In the subsequent control cycle, when it is determined in S11 that the limit execution flag G is turned on, the processing proceeds to S16. In S16, the limit continuation counter CT that measures the duration of the fuel discharge limit is increased.

In S17, it is determined whether the rail pressure Pr is lower than the predetermined release determination pressure TH3 accompanying the opening of the relief valve 80. When the rail pressure Pr is equal to or higher than the release determination pressure TH3, the spike fuel pressure is not generated, and the processing proceeds to S18.

Since the feed pressure target value F * is lowered with respect to the low pressure pump 20, the rail pressure Pr does not rise to the valve opening pressure TH1 and the relief valve 80 does not open. In the present embodiment, the fuel discharge restriction is released whichever comes first at the time when it is determined that the relief valve 80 is opened after the fuel discharge restriction is performed or at the time when the release time TH5 elapses.

In S18, it is determined whether the limit continuation counter CT exceeds the release time TH5. The release time TH5 is set to a time longer than the assumed time when the relief valve 80 opens and generation of the spike fuel pressure is terminated. When negative determination in S18 is made, the processing of FIG. 3 is terminated.

In the subsequent control cycle, when it is determined in S17 that the relief valve 80 is opened, or when the limit continuation counter CT exceeds the release time TH5 in S18, the processing proceeds to S19. In S19, the feed pressure target value F* changed in S14 is returned to the original value. As a result, the fuel discharge limit for the low pressure pump 20 is released.

In S20, the limit execution flag G is turned off and the limit continuation counter CT is initialized to zero. The processing shown in FIG. 3 is terminated.

Figure 4:
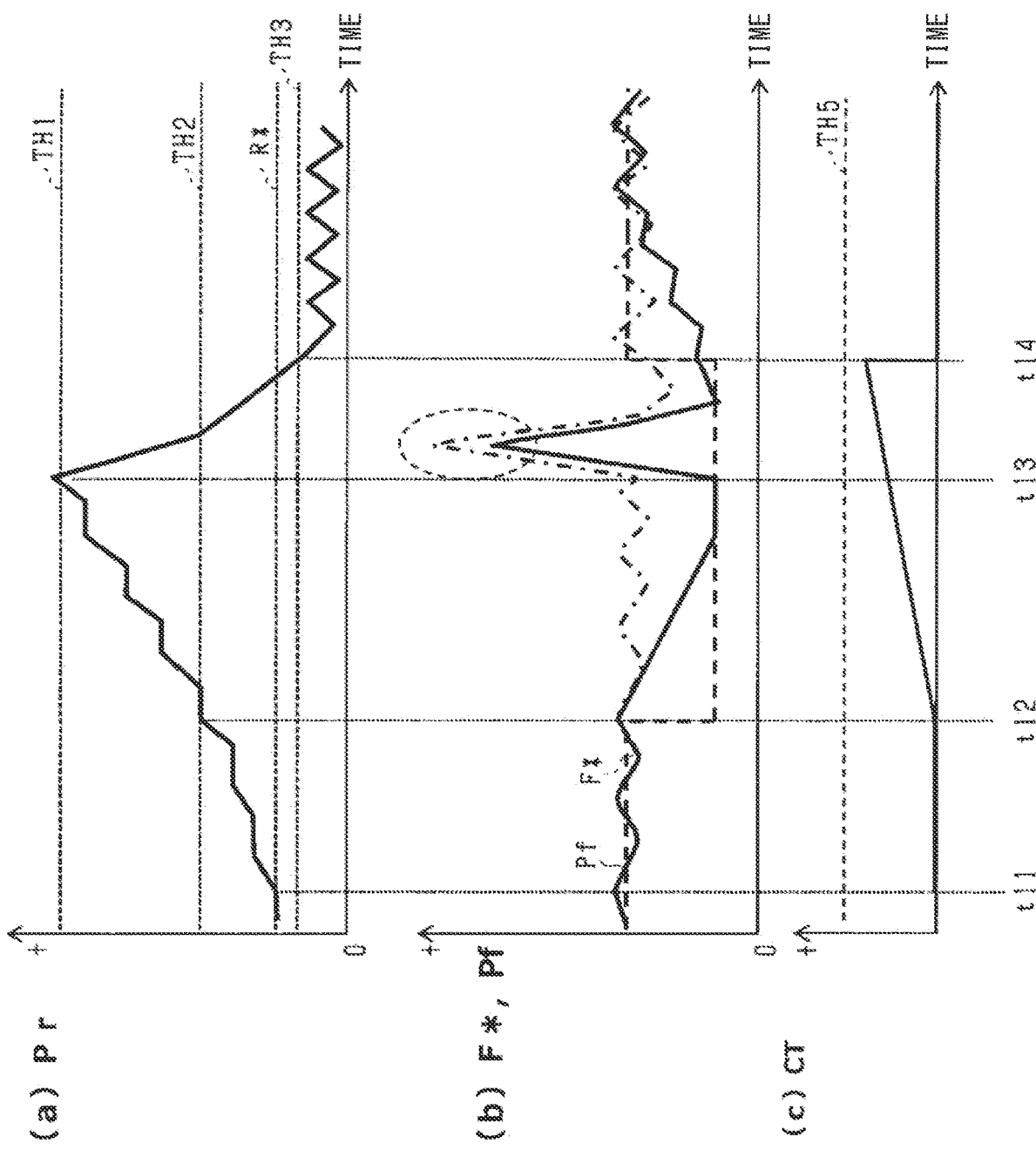
FIG. 4 is a timing chart showing an operation of ECU when a high pressure abnormality occurs.

Next, the operation of the ECU 90 at the time of high pressure abnormality will be described. In FIG. 4, (a) shows the transition of the rail pressure Pr, and (b) shows the transition of the feed pressure target value F* and the feed pressure Pf. In FIG. 4, (c) shows the transition of the limit continuation counter CT.

Before the time point t11, the high pressure pump 30 has not failed. The fuel discharge of the high pressure pump 30 is adjusted so that the rail pressure of the delivery pipe 60 is controlled by the rail pressure target value R*. Immediately before the time point t11, the high pressure pump 30 fails, and the full discharge abnormality in which the high pressure pump 30 discharges at the maximum discharge amount occurs. The discharge amount for one time from the high pressure pump 30 exceeds the injection amount for one time of the injector 62, and the rail pressure Pr increases with each discharge by the high pressure pump 30.

At the time point t12, since the rail pressure Pr becomes higher than the determination pressure TH2, the feed pressure target value F* of the low pressure pump 20 is lowered. The fuel discharge of the low pressure pump 20 is limited so that the feed pressure Pf is controlled by the changed feed pressure target value F*. At the time point t12, the limit continuation counter CT starts to increase.

At the time point t13, the rail pressure Pr reaches the valve opening pressure TH1, and the relief valve 80 changes from the closed state to the opened state. With the opening of the relief valve 80, the fuel in the high pressure side pipe 44 returns to the low pressure chamber 40 through the return pipe 45, so that a spike fuel pressure in which the feed pressure Pf changes like a spike is generated. In (b) of FIG. 4, as a comparative example, a feed pressure Pf when the feed pressure target value F* is not changed is shown by a dash-dot line. When the feed pressure target value F* is not lowered, the feed pressure Pf changes at a higher value in the period from the time point t12 to the time point t13 than when the feed pressure target value F* is changed.

In the present embodiment, the feed pressure Pf is lowered in the period from when the rail pressure Pr becomes higher than the determination pressure TH2 until the relief valve 80 opens. Therefore, after the relief valve 80 opens, the peak value of the spike fuel pressure is reduced as compared with the case where the feed pressure Pf is not lowered.

At the subsequent time point t14, the rail pressure Pr is lowered to the release determination pressure TH3 before the limit continuation counter CT reaches the release time TH5. As a result, the fuel discharge limit for the low pressure pump 20 is released, the feed pressure target value F* is restored, and the feed pressure Pf rises to the feed pressure target value F*.

According to the first embodiment described above, the following effects can be achieved.

When the ECU 90 determines that the rail pressure Pr rises to the determination pressure TH2 that is higher than the pressure range assumed in the delivery pipe 60 and lower than the valve opening pressure TH1, the ECU 90 lowers the feed pressure target value F* of the low pressure pump 20. As a result, the pressure on the low pressure portion side can be lowered when the possibility that the relief valve 80 is opened increases with the increase in pressure when the relief valve 80 is closed. Even when the relief valve 80 is opened, the configuration can cause the spike fuel pressure to be lowered. Thus, deterioration of the low pressure portion can be suppressed.

The ECU 90 releases the fuel discharge limit when it is determined that the relief valve 80 is opened. Therefore, continuation of the fuel discharge limit is inhibited even after the spike fuel pressure is generated due to the opening of the relief valve 80. As a result, it is possible to inhibit an excessive decrease in the pressure of the low pressure portion, so that it is possible to inhibit a discharge failure of the high pressure pump 30 and a fuel failure due to the fuel pressure dropping to the saturated vapor pressure.

The ECU 90 release the fuel discharge limit whichever comes first at the time when it is determined that the relief valve 80 is opened after the fuel discharge limit is performed or at the time when the release time TH5 is reached. Thereby, even when the relief valve 80 is not opened, it is possible to inhibit the feed pressure Pf from being excessively lowered.

When it is determined that the rail pressure Pr has risen to the determination pressure TH2, the ECU 90 limits the fuel discharge to the low pressure pump 20 on the condition that the engine rotation speed Ne is smaller than the speed determination value TH4. As a result, it is possible to inhibit the feed pressure Pf from being excessively lowered when the peak value of the spike fuel pressure is unlikely to increase.

Modification of First Embodiment

As a fuel discharge limit for the low pressure pump 20, the fuel discharge of the low pressure pump 20 may be stopped. In this case, instead of lowering the feed pressure target value F* in S14 of FIG. 3, the fuel discharge of the low pressure pump 20 may be stopped. For example, the fuel discharge of the low pressure pump 20 is stopped by not supplying electric power to the low pressure pump 20. Further, when the affirmative determination is made in S17 or S18, the processing proceeds to S19 and the fuel discharge of the low pressure pump 20 may be restarted. This modification also provides the similar effects as the first embodiment.

It may be determined that the relief valve 80 is opened based on the estimated behavior of the rail pressure Pr in the pressure drop period when the relief valve 80 is assumed to be closed. Specifically, the ECU 90 may determine that the relief valve 80 is opened in S17 when reduction speed of the rail pressure Pr is higher than the predetermined reduction speed determination value after the fuel discharge limit is applied to the low pressure pump 20.

When it is determined that the saturated vapor pressure of the fuel is higher than the lower limit of the suction limit pressure of the fuel in the high pressure pump 30, the ECU 90 sets the feed pressure target value F* to the saturation of the fuel in S14 of FIG. 3. When it is determined that the lower limit of the fuel suction limit pressure in the high pressure pump 30 is higher than the saturated vapor pressure of the fuel, the ECU 90 sets the feed pressure target value F* to the lower limit value of the fuel suction limit pressure in the pump 30 in S14 of FIG. 3.

Second Embodiment

A second embodiment is different from the first embodiment as described below. The parts with the same reference numerals indicate the same parts, and the description thereof will not be repeated.

When the high pressure pump 30 has a high pressure abnormality, the rail pressure Pr rises from the determination pressure TH2 to the valve opening pressure TH1, and the feed pressure Pf needs to be sufficiently lowered until the relief valve 80 is opened. Therefore, in the present embodiment, as the fuel discharge limit of the low pressure pump 20, the stop of fuel discharge by the low pressure pump 20 and the decrease of the feed pressure target value F* are used together.

Next, the fuel discharge limit for reducing the spike fuel pressure according to the present embodiment will be described with reference to FIG. 5.

Figure 5:
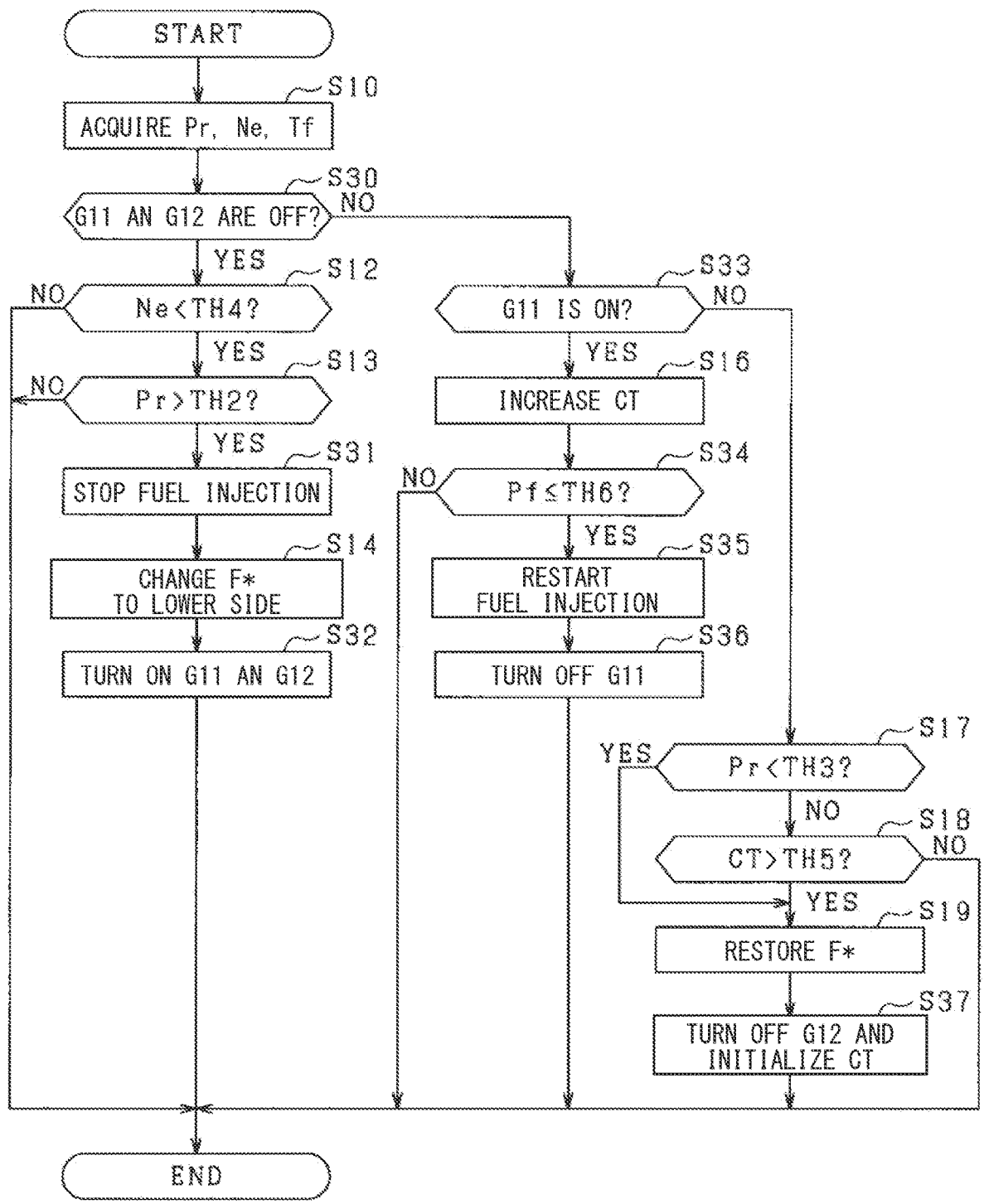
FIG. 5 is a flowchart showing a fuel discharge limit according to a second embodiment.

The processing shown in FIG. 5 is repeatedly executed by the ECU 90 in a predetermined control cycle period.

In S30, as the fuel discharge limit, it is determined whether the first limit execution flag G11 indicating that the fuel discharge of the low pressure pump 20 is stopped and the second limit execution flag G12 indicating that the feed pressure target value F* of the low pressure pump 20 is lowered are off. When a negative determination is made in S30, the processing proceeds to S12.

After making an affirmative determination in S12, in S13, when it is determined that the rail pressure Pr is higher than the determination pressure TH2, the processing proceeds to S31. In S31, the fuel discharge of the low pressure pump 20 is stopped. For example, the fuel discharge of the low pressure pump 20 is stopped by switching the drive signal GS for supplying electric power to the low pressure pump 20 from the on operation command to the off operation command.

In S14, with the fuel discharge of the low pressure pump 20 stopped, the feed pressure target value F* of the low pressure pump 20 is set to the higher of the saturated vapor pressure of the fuel or the lower limit of the suction limit pressure of the high-pressure pump 30.

In S32, both the first limit execution flag G11 and the second limit execution flag G12 are turned on. The processing shown in FIG. 5 is terminated.

Since both the first limit execution flag G11 and the second limit execution flag G12 are turned on, in the subsequent control cycle, the S30 is negatively determined, and the processing proceeds to S33. In S33, since the first limit execution flag G11 is turned on, the processing proceeds to S16 to increase the limit continuation counter CT.

In S34, it is determined whether the discharge restart condition for restarting the fuel discharge of the low pressure pump 20 is satisfied. In the present embodiment, the restart condition is defined that the feed pressure Pf is equal to or less than the discharge restart pressure TH6, which is obtained by adding a predetermined margin pressure to the feed pressure target value F* set in S14.

When it is determined that the discharge restart condition is not satisfied, the processing of FIG. 5 is temporarily terminated. On the other hand, when it is determined that the discharge restart condition is satisfied, the processing proceeds to S35. In S35, the fuel discharge by the low pressure pump 20 is restarted. In S36, the limit implementation flag G11 is turned off. The processing shown in FIG. 5 is terminated.

After restarting the fuel discharge, the low pressure pump 20 adjusts the fuel discharge according to the feed pressure target value F* set in S13. Therefore, the fuel discharge of the low pressure pump 20 is limited even after the fuel discharge by the low pressure pump 20 is restarted.

After that, since the second limit execution flag G12 is turned on, the negative determination in S30 is made, and the processing proceeds to S33. Since the first limit execution flag G11 is turned off, the negative determination in S33 is made, and the processing proceeds to S17. When affirmatively determining S17 or S18, the processing proceeds to S19 to restore the feed pressure target value F*. In S37, the second limit execution flag G12 is turned off and the limit continuation counter CT is initialized to zero.

Figure 6:
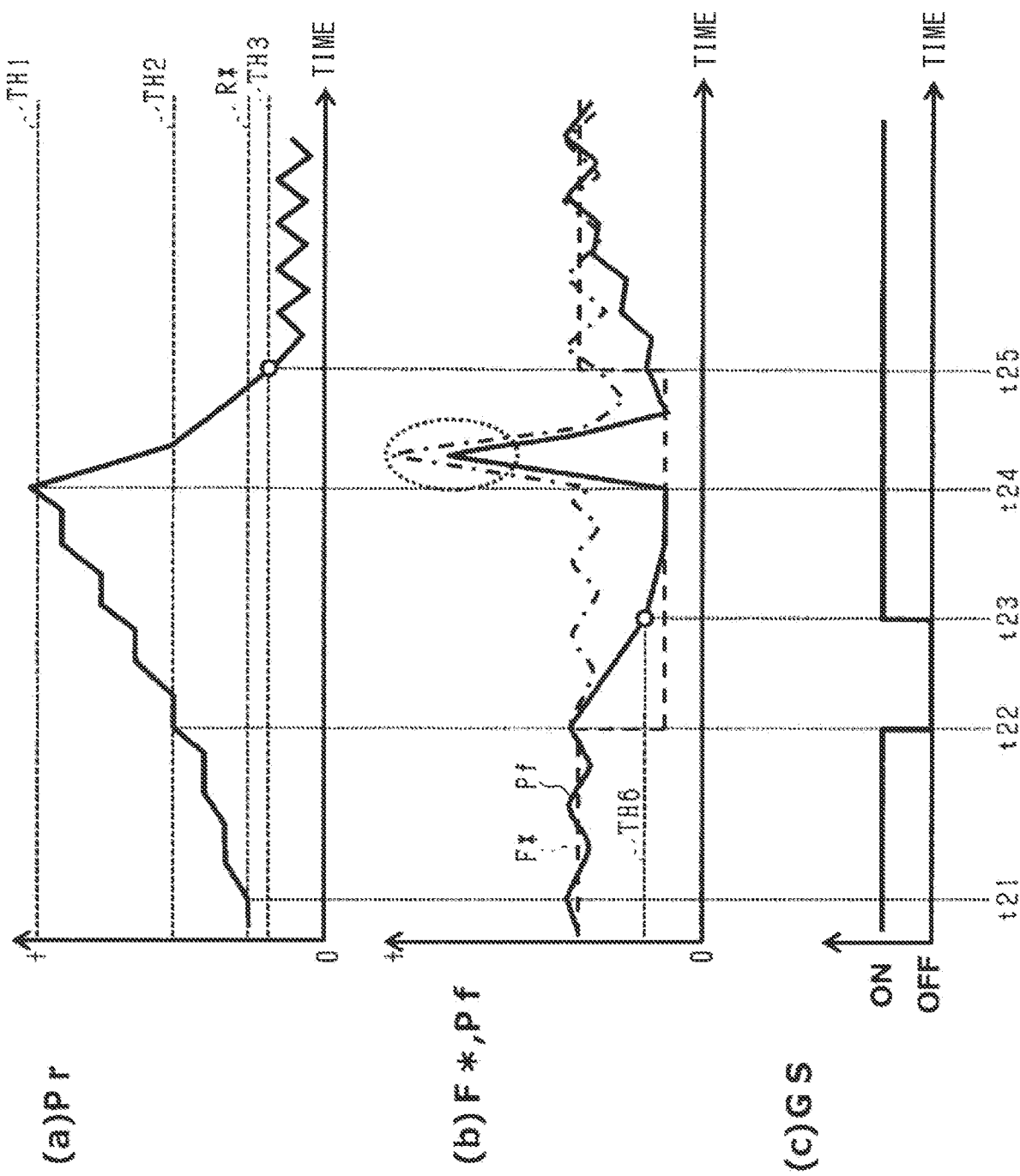
FIG. 6 is a timing chart showing an operation of ECU when a high pressure abnormality occurs.

Next, the operation of the ECU 90 at the time of high pressure abnormality according to the second embodiment will be described. In FIG. 6, (a) shows the transition of the rail pressure Pr, and (b) shows the transition of the feed pressure target value F* and the feed pressure Pf. In FIG. 6, (c) shows the transition of the drive signal GS of the low pressure pump 20.

Before the time point t21, the high pressure pump 30 has not failed. The fuel discharge of the high pressure pump 30 is adjusted so that the rail pressure of the delivery pipe 60 is controlled by the rail pressure target value R*. Immediately before the time point t21, the high pressure pump 30 fails, and the full discharge abnormality in which the high pressure pump 30 discharges at the maximum discharge amount occurs.

At the time point t22, when the rail pressure Pr becomes higher than the determination pressure TH2, the drive signal GS is switched from the on operation command to the off operation command, and the fuel discharge of the low pressure pump 20 is stopped. As a result, the feed pressure Pf is lowered quickly in the early period after the rail pressure Pr rises above the determination pressure TH2. Further, the feed pressure target value F* of the low pressure pump 20 is changed to a low value.

At the time point t23, when the feed pressure Pf becomes equal to or less than the discharge restart pressure TH6, the drive signal GS is switched from the off operation command to the on operation command, and the fuel discharge of the low pressure pump 20 is restarted. After the time point t23, the fuel discharge of the low pressure pump 20 is adjusted so that the feed pressure Pf becomes the feed pressure target value F* changed at the time point t22. Therefore, the rate of decrease of the feed pressure Pf becomes smaller than the rate of decrease between the time points t22 and t23.

At the time point t24, the rail pressure Pr reaches the valve opening pressure TH1, and the relief valve 80 changes from the closed state to the opened state. With the opening of the relief valve 80, the spike fuel pressure is generated. In (b) of FIG. 6, as a comparative example, a feed pressure Pf when the fuel discharge of the low pressure pump 20 is not limited is shown by a dash-dot line. In the present embodiment, the feed pressure Pf is lowered quickly due to the stop of fuel discharge of the low pressure pump 20 between the time point when the rail pressure Pr becomes higher than the determination pressure TH2 and the time point when the relief valve 80 is opened. Thus, the subsequent decrease in the feed pressure target value F* causes the feed pressure Pf to continue to decrease. Therefore, after the relief valve 80 is opened, the peak value of the spike fuel pressure is reduced as compared with the case where the fuel discharge is not limited.

At the time point t25, the rail pressure Pr is lowered to the release determination pressure TH3, and the fuel discharge limit on the low pressure pump 20 is released. Therefore, the feed pressure target value F* is restored, and the feed pressure Pf rises.

In the present embodiment described above, the ECU 90 stops the fuel discharge by the low pressure pump 20 as the fuel discharge limit, and then lowers the feed pressure Pf than in the case where it is not determined that the rail pressure Pr has risen to the determination pressure TH2. As a result, when the rail pressure Pr rises to the determination pressure TH2, the feed pressure Pf can be quickly lowered. Therefore, even when the time required for the rail pressure Pr to reach the valve opening pressure TH1 after exceeding the determination pressure TH2 is short, the spike fuel pressure can be sufficiently lowered.

Other Embodiments

The convergence value of the rail pressure Pr after the relief valve 80 is opened changes according to the engine rotation speed Ne and the fuel temperature Tf. Therefore, the ECU 90 may calculate the release determination pressure TH3 for releasing the fuel discharge limit based on the engine rotation speed Ne and the fuel temperature Tf. Specifically, when the engine rotation speed Ne is fast, the rail pressure Pr converges at a higher value. Therefore, when the engine rotation speed Ne is fast, the release determination pressure may be calculated to s higher value. Further, the higher the fuel temperature Tf is, the lower the volume elastic modulus of the fuel is, so that the rail pressure Pr is less likely to decrease. Therefore, the higher the fuel temperature Tf is, the higher the release determination pressure may be calculated. Even in this case, the ECU 90 may release the fuel discharge limit when the rail pressure Pr is lowered to the release determination pressure TH3 or when the predetermined release time TH5 has elapsed, whichever comes first.

The relief valve 80 may be provided in the delivery pipe 60. In this case, with the opening of the relief valve 80, the fuel in the delivery pipe 60 returns to the low pressure portion through the return pipe 45.

As the pressure of the high pressure portion, instead of using the rail pressure Pr, the pressure in the high pressure side pipe 44 or the pressure in the injector 62 may be used.

The control apparatus and the technique according to the present disclosure may be achieved by a dedicated computer provided by constituting a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. Further, the computer program may store a computer-readable non-transitional tangible recording medium as an instruction to be executed by the computer.

Although the present disclosure has been described in accordance with the examples, it is understood that the present disclosure is not limited to such examples or structures. The present disclosure encompasses various modifications and variations within the scope of equivalents. Furthermore, various combination and formation, and other combination and formation including one, more than one or less than one element may be made in the present disclosure.

What is claimed is:

1. A control device for a fuel injection system, the fuel injection system including:
    a low pressure pump configured to pressurize a fuel in a fuel container and discharge the fuel;
    a high pressure pump configured to increase a pressure of the fuel discharged from the low pressure pump and discharge high pressure fuel;
    an accumulator configured to store the high pressure fuel discharged from the high pressure pump;
    a fuel injection valve configured to inject the high pressure fuel in the accumulator;
    a relief valve that is provided in a high pressure portion provided downstream from the high pressure pump and configured to open when a high pressure abnormality occurs in the high pressure portion; and
    a return pipe configured to return the high pressure fuel in the high pressure portion to a low pressure portion provided downstream from the low pressure pump by opening of the relief valve,
    the control device configured to control the high pressure fuel in the accumulator within a predetermined pressure range, the control device comprising:
    a fuel pressure determination unit configured to determine whether a pressure in the high pressure portion rises to a predetermined determination pressure higher than the pressure range and lower than a valve opening pressure for opening the relief valve; and
    a limiting unit configured to cause the low pressure pump to perform a fuel discharge limit when the fuel pressure determination unit determines that the pressure in the high pressure portion rises to the determination pressure.

2. The control device for the fuel injection system according to claim 1, wherein
    a pressure in the low pressure portion is configured to be changed by adjusting a discharge of the low pressure pump, and
    the limiting unit, as the fuel discharge limit, lowers the pressure in the low pressure portion to be lower than a pressure in a case where the fuel pressure determination unit does not determine that the pressure in the high pressure portion rises to the determination pressure.

3. The control device for the fuel injection system according to claim 2, wherein
    the limiting unit, as the fuel discharge limit, causes the low pressure pump to stop discharging the fuel and then lowers the pressure in the low pressure portion to be lower than the pressure in the case where the fuel pressure determination unit does not determine that the pressure in the high pressure portion rises to the determination pressure.

4. The control device for the fuel injection system according to claim 1, further comprising
    a valve opening determination unit configured to determine whether the relief valve is opened after the fuel discharge limit is started, wherein
    the limiting unit releases the fuel discharge limit when the valve opening determination unit determines that the relief valve is opened.

5. The control device for the fuel injection system according to claim 4, wherein
    the limiting unit releases the fuel discharge limit when the valve opening determination unit determines that the relief valve is opened or a predetermined release time elapses, whichever comes first.

6. The control device for the fuel injection system according to claim 1, wherein
    the limiting unit releases the fuel discharge limit when the pressure of the high pressure portion is lowered to a predetermined release determination pressure lower than the determination pressure or a predetermined release time elapses, whichever comes first.

7. The control device for the fuel injection system according to claim 1, wherein
    the high pressure pump increases the pressure of the fuel by an output shaft of an internal combustion engine rotating, and
    when the fuel pressure determination unit determines that the pressure of the high pressure portion rises to the determination pressure, the limiting unit performs the fuel discharge limit on condition that a rotation speed of the output shaft of the internal combustion engine is lower than a predetermined rotation speed.

8. A fuel injection system comprising:
    a low pressure pump configured to pressurize a fuel in a fuel container and discharge the fuel;
    a high pressure pump configured to increase a pressure of the fuel discharged from the low pressure pump and discharge high pressure fuel;
    an accumulator configured to store the high pressure fuel discharged from the high pressure pump;
    a fuel injection valve configured to inject the high pressure fuel in the accumulator;
    a relief valve that is provided in a high pressure portion provided downstream from the high pressure pump and configured to open when a high pressure abnormality occurs in the high pressure portion;
    a return pipe configured to return the high pressure fuel in the high pressure portion to a low pressure portion provided downstream from the low pressure pump by opening of the relief valve; and
    a processor configured to:
        control the high pressure fuel in the accumulator within a predetermined pressure range;
        determine whether a pressure in the high pressure portion rises to a predetermined determination pressure higher than the pressure range and lower than a valve opening pressure for opening the relief valve; and
        cause the low pressure pump to perform a fuel discharge limit when the processor determines that the pressure in the high pressure portion rises to the determination pressure.

* * * * *